Patented July 6, 1948

2,444,509

UNITED STATES PATENT OFFICE 2,444,509

COMPOSITION OF MATTER

Vladimir N. Ipatieff, Chicago, and Vladimir Haensel, Clarendon Hills, Ill., assignors to Universal Oil Products Company, Chicago, Ill., a corporation of Delaware No Drawing. Original application December 24, 1941, Serial No. 424,276, now Patent No. 2,386,957, October 16, 1945. Divided and this application March 28, 1945, Serial No. 585,239½

2 Claims. (Cl. 252—211.5)

This application is a division of our copending application Serial No. 424,276, filed December 24, 1941, now Patent No. 2,386,957, October 16, 1945.

This invention relates to the dehydrogenation and dehydrocyclization of aliphatic hydrocarbons to produce aromatics therefrom and is characterized by the use of particular types of catalysts which have been found to be especially effective for this purpose.

The invention is more specifically concerned with the use of coordinated conditions of temperature, pressure and space velocity when employing the particular types of catalysts which will be presently described.

The principal value of processes for the dehydrocyclization of aliphatic hydrocarbons lies in the fact that by this reaction, particularly when catalysts are used, high yields of aromatic hydrocarbons are produced having the same number of carbon atoms as the aliphatic hydrocarbons treated whereas when aromatic hydrocarbons are made by the intensive and non-catalytic cracking of petroleum and coal tars, there is a large production of undesirable by-products including on the one hand hydrogen and low-boiling hydrocarbons which are gaseous under normal conditions and on the other hand heavier tars and coke. There are further difficulties encountered in the separation of the aromatics produced on account of the formation of polycyclic ring compounds such as naphthalene, anthracene, phenanthrene, etc.

When a given hydrocarbon, such as for example, hexane is dehydrogenated in the presence of properly selected catalyst and under suitably related conditions of operation, yields of benzol much higher than those obtainable by non-catalytic cracking may be obtained. Similarly, high yields of aromatics may be obtained by dehydrocycling analogous unsaturated hydrocarbons containing at least 6 carbon atoms in straight chain arrangement, including alkenes, alkynes and alkadienes, although conditions of operation when employing these unsaturated charging stocks will be different than those employed in the case of corresponding paraffin hydrocarbons.

In one specific embodiment the present invention comprises the treatment of aliphatic hydrocarbons for the production of substantial yields of aromatic hydrocarbons therefrom which consists in subjecting said aliphatic hydrocarbons at elevated temperatures to contact with composite catalysts comprising essentially zinc oxide, copper and alumina.

The catalysts which characterize the present invention are preferably prepared by a series of steps involving first the precipitation of the carbonates of zinc and copper upon prepared granular alumina suspended in aqueous solutions, containing salts of both zinc and copper, by the addition of ammonium carbonate or alkali metal carbonates to the solutions. Precipitations are usually carried out at a temperature of approximately 80° C., although the precipitating reagent may be added at ordinary temperatures and the solution then heated to about 80° C. after which the suspended material is filtered, washed substantially free of absorbed or occluded salts, heated at approximately 250° C., formed into particles of regulated size such as, for example, small cylindrical pellets by customary procedures and then reduced by hydrogen or hydrogen-containing gas mixtures.

In catalysts thus prepared reducing conditions are preferably employed which almost completely reduce the copper oxide to metallic copper but which do not reduce the zinc oxide to any extent. By this means greater stability of the catalyst is assured since there will be substantially no volatilization of zinc at the conditions employed when hydrocarbons are treated. It is good practice to have the finally prepared catalyst consist of about 15 per cent zinc oxide, 5 per cent copper and 80 per cent alumina by weight, although alternative catalysts of good activity may comprise not less than about 5% zinc oxide, not more than about 10% copper and the remainder alumina. While the higher percentages of copper may give initially higher catalytic activity, it has been found that pelleted materials containing over this percentage have lower crushing strengths so that they are inclined to develop fines on handling. If the catalysts are to be used in the form of a powder, the relative amounts of the zinc oxide, copper and alumina can be varied over a wider range in case advantages are gained thereby. Instead of concurrently precipitating zinc and copper carbonates, they may be deposited successively upon the alumina.

The alumina employed a a relatively inert supporting or carrying material for the zinc oxide and copper is preferably of the so-called "activated" variety which is prepared by the controlled heating of either precipitated hydrous oxides of alumina or natural minerals such as, gibbsite, hydrargillite or bauxite at temperatures of the order of 500° C. which corresponds to only partial dehydration and the presence of relatively large amounts of gamma alumina. If the original hydrous or hydrated oxides are heated at much higher temperatures of from about 800 to about 900° C., the alpha form of alumina develops which is not as good a carrier for the active components of the catalyst composites. Completely dehydrated alumina is not suitable in the present types of catalyst composites.

In utilizing the described types of catalysts for producing aromatics from aliphatic hydrocarbons, the temperatures employed will vary from about 450 to about 650° C., depending upon the type of aliphatic treated, its molecular weight, boiling point, etc. Best results are usually obtained at approximately atmospheric pressure and at liquid space velocities varying from about 0.1 to about 5 volumes of liquid charge per hour per volume of catalyst space. When cycling olefins, diolefins or acetylenes, best conditions of operation will usually include the use of subatmospheric pressures with space velocities within the lower ranges of those specified, these conditions tending to lessen the formation of carbon from undesirable side reactions due to the decomposition of the unsaturated compounds.

In the ordinary operation of the process a hydrocarbon or mixture of hydrocarbons to be treated is vaporized, heated to an optimum temperature in the range specified and passed through a bed of granular catalyst at a space velocity found by trial to produce the best results. Reactions of cyclization are endothermic and it is convenient to employ reactors of the adiabatic type, the vapors of the hydrocarbon charge being admitted to the catalyst chamber at a temperature somewhat above the optimum and leaving at a temperature somewhat below. After being discharged from the reactor the products are subjected to fractionation to separate hydrogen and other fixed gases, the aromatic hydrocarbons formed and unconverted materials which it may be desired to recycle for further treatment. After a period of hydrocarbon processing, the catalysts gradually accumulate some carbonaceous deposits which may be periodically burned off by the use of oxidizing gas mixtures while other reactors in parallel connection are operating upon the charge to the plant.

In some instances improved results particularly in respect to carbon deposits may be obtained when limited amounts of hydrogen are added to the vapors of the hydrocarbon undergoing dehydrocyclization, this effect being probably due to the suppression of cracking reactions.

The following data showing the results of experiments are introduced to illustrate the character of the results obtainable when aliphatic hydrocarbons are converted to aromatic hydrocarbons while in contact with the present types of catalysts, although neither examples of catalyst manufacture nor of their use in dehydrocyclization are indicated to unduly limit the scope of the invention.

The method of preparing catalysts of the present character is exemplified in the following description:

183 parts by weight of zinc nitrate and 23.7 parts by weight of copper nitrate were dissolved in 1000 parts by weight of water and added to a rapidly agitated suspension of 192.5 parts by weight of aluminum oxide in 2500 parts of water. The entire material was heated to 80–85° C. and 81 parts by weight of ammonium carbonate were dissolved in 500 parts of water and added to the hot suspension. After the addition of the ammonium carbonate solution, the suspension, now consisting of basic copper carbonate, zinc carbonate and aluminum oxide, was cooled without agitating and finally washed by decantation. This was followed by filtering and further washing. The precipitate was dried at 250° C. for 10 hours and reduced with hydrogen at 225° C. for 1 hour using a mixture of about one volume of hydrogen and about three volumes of nitrogen.

The reduced catalyst, now consisting essentially of copper, zinc oxide and alumina, was pelleted using a hydrogenated cocoanut oil as a lubricant. The pilled catalyst was treated with air to remove the lubricant and again reduced with a hydrogen-nitrogen mixture at the operating temperature.

The composition of the reduced catalyst as determined by analysis was approximately as follows:

| | |
|---|---:|
| ZnO | 15.0 |
| Cu | 5.4 |
| $Al_2O_3$ | 79.6 |
| | 100.0 |

Two catalysts prepared as above described and designated below as A and B were used for the production of toluene from normal heptane under substantially atmospheric pressure and at temperatures and hourly liquid space velocities indicated in the following table:

| Run No. | Catalyst | Duration of Run, hours | Furnace Temp., °C. | Av. Hourly Liquid Space Velocity | Wt. Per cent Yield of Toluene |
|---|---|---|---|---|---|
| 1 | A | 3 | 567 | 0.23 | 33 |
| 2 | A Regenerated | 2 | 567 | 0.23 | 35 |
| 3 | B | 1 | 560 | 1.0 | 18 |
| 4 | B | 9 | 568 | 0.37 | 30 |
| 5 | B Regenerated | 3½ | 567 | 0.31 | 32 |

It can be seen from the above data that at a relatively constant temperature best results are obtained on both catalysts A and B when using space velocities of the order of 0.23 and 0.31 respectively. It is to be noted also that the activity of both catalysts was not reduced, but rather restored and even improved after regeneration. By recycling of the unconverted heptane the ultimate yield of toluene was raised to about 65 per cent in run 2.

The data given in the following table include those obtained on further runs with catalyst B at varying temperatures and show that best once-through yields are obtained at the furnace temperature of 537° C.

| Run No. | Duration of Run, Hours | Temp. °C. Furnace | Av. Hourly Liquid Space Velocity | Wt. Per Cent Yield of Toluene |
|---|---|---|---|---|
| 1 | 2 | 519 | 0.72 | 22 |
| 2 | 2 | 563 | 0.77 | 38 |
| 3 | 2 | 537 | 0.58 | 39 |

The following data indicate the effect on carbon deposits when using hydrogen in connection with the present types of catalysts. Catalyst B was used to dehydrocycle normal heptane and the following table shows the conditions of operation.

| Run No. | Catalyst Temp. C. | Av. Hourly Liquid Space Velocity | Vol. Hydrogen/Vol. Heptane | Wt. Per Cent Yield of Toluene | Wt. Per Cent Carbon on Catalyst |
|---|---|---|---|---|---|
| 1 | 531 | 0.94 | 0 | 31.2 | 2.62 |
| 2 | 536 | 0.94 | 500 | 32.0 | 1.46 |

We claim as our invention:

1. A catalyst consisting essentially of a major proportion of alumina, from about 5% to about 15% by weight of zinc oxide and from about 5% to about 10% by weight of copper.

2. A catalyst consisting essentially of about 80% by weight of alumina, about 15% by weight of zinc oxide and about 5% by weight of copper.

VLADIMIR N. IPATIEFF.
VLADIMIR HAENSEL.

REFERENCES CITED

The following references are of record in the file of this patent:

UNITED STATES PATENTS

| Number | Name | Date |
|---|---|---|
| 1,746,781 | Lazier | Feb. 11, 1930 |
| 2,077,409 | Graves | Apr. 20, 1937 |
| 2,327,189 | Ipatieff et al. | Aug. 17, 1943 |
| 2,334,100 | Ipatieff et al. | Nov. 9, 1943 |
| 2,366,531 | Ipatieff et al. | Jan. 2, 1945 |